United States Patent [19]

Gundlach et al.

[11] Patent Number: 4,763,141

[45] Date of Patent: Aug. 9, 1988

[54] PRINTING APPARATUS WITH IMPROVED ION FOCUS

[75] Inventors: Robert W. Gundlach, Victor; Richard F. Bergen, Ontario, both of N.Y.

[73] Assignee: Xerox Corporation, Stamford, Conn.

[21] Appl. No.: 80,852

[22] Filed: Aug. 3, 1987

[51] Int. Cl.[4] .............................. G01D 15/00

[52] U.S. Cl. .............................. 346/158; 346/153.1

[58] Field of Search .............................. 346/158, 153.1, 159; 250/423 R, 423 F; 101/DIG. 13; 400/119; 358/300

[56] References Cited

U.S. PATENT DOCUMENTS

| | | | |
|---|---|---|---|
| 3,396,308 | 8/1968 | Whitmore | 317/4 |
| 3,598,991 | 8/1971 | Nost | 250/49.5 |
| 3,611,414 | 10/1971 | Frank | 346/159 |
| 4,100,411 | 7/1978 | Davis | 250/324 |
| 4,155,093 | 5/1979 | Fotland et al. | 346/159 |
| 4,174,170 | 11/1979 | Yamamoto et al. | 355/3 |
| 4,463,363 | 7/1984 | Gundlach et al. | 346/159 |
| 4,524,371 | 6/1985 | Sheridon | 346/159 |

FOREIGN PATENT DOCUMENTS

| | | |
|---|---|---|
| 54-156546 | 12/1979 | Japan . |
| 55-73070A | 2/1980 | Japan . |

*Primary Examiner*—Arthur G. Evans
*Attorney, Agent, or Firm*—William A. Henry, II

[57] ABSTRACT

A printing unit includes a current limited, low capacitance corona wire located 1-5 mm away from biased conductive plates which form a slit that allows ions to pass therethrough onto a receptor surface. The conductive plates are used to control the flow of ions through the slit and opposing wedges are positioned on each conductive plate in order to focus additional ions to the center of the slit. At inside edges of the slit there are additional fringe fields that aid in pumping ions out of the slit.

20 Claims, 4 Drawing Sheets

PRINTING APPARATUS WITH IMPROVED ION FOCUS

Reference is hereby made to commonly assigned copending application Ser. No. 07 081068, of Robert W. Gundlach and Richard F. Bergen, filed 08/03/87 and entitled "Self - Cleaning Scorotron with Focused Ion Beam", which is incorporated herein by reference.

This invention relates to a novel ion printing apparatus wherein ions are generated in a housing and passed through a slit where they are modulated by electrodes as they exit the slit in order to print a specific pattern on a charge receptor.

Industry has desired to provide a reliable, high resolution noncontacting printing system. One approach to this end is ion projection printing which, in one form, entails depositing electrostatic charges in a latent image pattern directly upon a charge receptor surface and then rendering the charge pattern visible, in some known manner. Clearly such a system would have decided benefits in machine design as compared to the known contact printing arrangements, as it would overcome the primary contact printing problem of friction and mechanical wear. Typically, ion projection printing comprises the generation of ions in an ion stream and the control of the ions which may reach a charge receptor surface.

Various ions generating devices are available for printing or charging purposes. For example, in U.S. Pat. No. 4,463,363 there is taught a D.C. air breakdown form of ion generator. In U.S. Pat. No. 4,524,371 a fluid jet assisted ion projection printing apparatus is disclosed that includes a housing having ion generation and ion modulation regions. A bent path channel, disposed through the housing, directs transport fluids with ions entrained therein adjacent an array of modulation electrodes which control the passage of ion beams from the device. Emission of charged particles in U.S. Pat. No. 4,155,093 is accomplished by extracting them from a high density source provided by an electrical gas breakdown in an alternating electrical field between two conducting electrodes separated by an insulator. A corona discharge unit is used in conductive toner transfer in a copier in U.S. Pat. No. 4,174,170. The corona discharge unit includes a slit to permit transfer of conductive toner particles onto a copy paper charged by the corona unit. The distance between the slit and a corona wire is 5 mm. U.S. Pat. No. 3,396,308 discloses a web treating device for generating a flow of ionized gas. This device includes an opening through which the gas is directed towards a receptor surface. An elongated hollow housing 11 has tapered sides 14 terminating in a pair of lips 15 which form a narrow and elongated slot 16. U.S. Pat. Nos. 3,598,991 and 4,100,411 show electrostatic charging devices including a corona wire surrounded by a conductive shield. In the '991 patent, a slit 13 is formed in the shield to allow ions to flow from wire 12 to a photoconductive surface 2 to deposit an electric charge thereon in the '411 patent, a pair of lips 16 and 17 define a corona ion slit 18. Japanese Patent Document No. 55-73070 discloses a powder image transfer type electrostatic copier that includes a corona discharge device having a slit in a shield plate. In Japanese Patent Document No. 54-156546 a corona charge is shown having a plurality of grating electrodes in the opening part of a corona shield electrode. These devices have not been entirely satisfactory in that they are costly, some of them are hard to fabricate and most are inefficient.

Accordingly, a simpler and more efficient printer apparatus is disclosed that includes a current limited, low capacitance corona wire, mounted within an insulated housing and located 0.25-5 mm away from conductive shims oppositely positioned on the bottom of the housing. The slit so formed is spaced less than 1 mm from the charge receptor surface in order to establish electrostatic fields that pump ions to the receptor surface. The housing has beveled insulating shields that focus additional ions into the slit Other features of the present invention will become apparent as the following description proceeds and upon reference to the drawings in which:

FIG. 1 is an enlarged elevational view of a printing unit in accordance with one aspect of the present invention.

FIG. 1A an enlarged partial portion of the printing geometry of FIG. 1 showing switchable electrodes.

Figure 1:
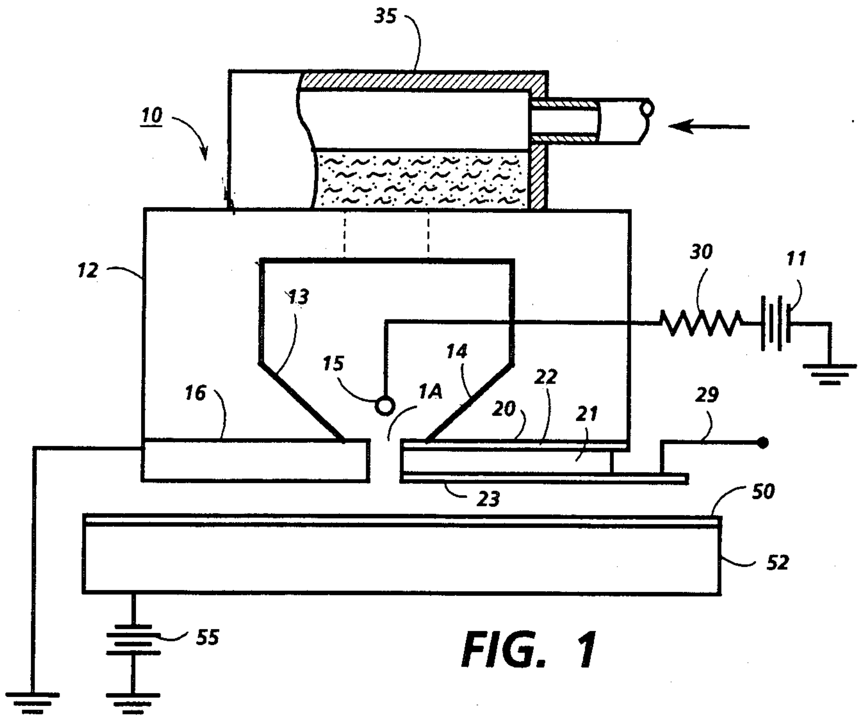
FIG. 1B is a diagram that shows the magnitude of the efficiency gain due to the incorporation of insulating wedges in the charging unit of FIG. 1.

While the invention will be described hereinafter in connection with preferred embodiments, it will be understood that no intention is made to limit the invention to the disclosed embodiments. On the contrary, it is intended to cover all alternatives, modifications, and equivalents as may be included within the spirit and scope of the invention as defined by the appended claims.

For a general understanding of the features of the invention, reference is had to the drawings. In the drawings, like reference numerals have been used throughout to designate identical elements.

Figure 1A:
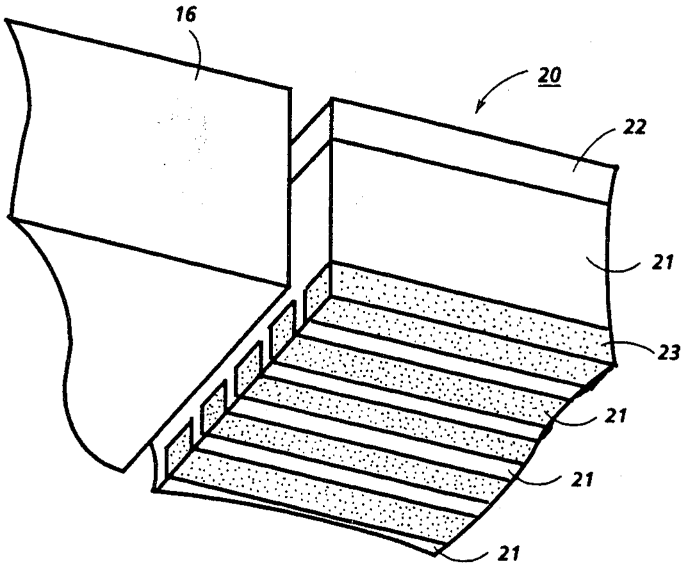

A novel ion printer unit is shown in FIG. 1 as 10 and includes an insulating rectangular housing 12 of a material such as plexiglass. Conductive solid electrode 16 and sandwich electrode 20 shown exploded in FIG. 1A, are attached by conventional means to the bottom of the housing 12 and define a slit or opening through which ions from coronode 15 are emitted. The conductive solid electrode 16 extends the height of the slit. Electrode 20 includes an insulator 21, an upper conductor 22 and addressable electrodes 23 that are spaced from each other on the bottom of insulator 21. The electrode 23 may be fashioned on a thin insulating substrate (such as Kapton) having a thin conductive layer on top and bottom surfaces. Once coated with photo resist, photo lithographic techniques can be employed to produce the desired conductive pattern 23. The addressable electrodes are individually controlled in a conventional manner by applying signals at 29. Two or Three level switching for modulation voltage or multiplexing benefits can be used, if desired. Also, a flush or recessed insulator can be used between the upper conductor member and addressable electrode members. The height of switchable electrode ends can be adjusted to reduce modulation voltage, and a protective insulating cover layer can be placed on the addressable electrodes with the exception of the corona regions at the ends or tips of the addressable electrodes, if desired. A positive high voltage power supply 11 furnishes the current that flows through resistor 30 supplying energy to coronode 15. "Corona Winds" are used to keep the slit adjacent coronode 15 clean. Typically, corotrons or scorotrons with nearby shields produce corona winds providing turbulent air flow, which can bring contaminants into the charging unit. Since the printing unit of the present invention has fields that are directed toward the slit, there is preferential air flow toward and out of the slit. By allowing replacement air to enter through low impedance filter 35, a clean, *positive* air flow is assured. A charge retentive surface 50 is mounted on a conductive substrate 52 which is biased by a power supply 55. Current limited, low capacitance wire 15 is located very close (0.25–5 mm) to the conductive electrodes 16 and 20 that form the slit. Insulating shields in the form of beveled wedges 13 and 14 are provided to focus additional ions to the center of the slit. The beveled insulators acquire charges that produce fields to drive additional ions toward the slit. At the slit edges (inside) there are additional fringe fields that aid in pumping ions out of the slit. However, by providing a strong field across the slit, (overcoming the pumping fields) the charges will be driven to the opposing electrode. To accomplish gating the ion stream through the slit, a potential difference is applied to conductive electrodes 23 relative to electrode 16 so that ion flow can be controlled. In one test, conductor 16 was grounded and electrodes 23 had a 0 to 80 V square wave (3 ms/cycle) impressed upon it. This produced a line pattren of charges on a receiver moving relative to the slit. Such a pattern of 5 mil lines and 5 mil spaces was recorded and developed on Versatec paper at a charging speed of 3.25"/sec.

Figure 1B:
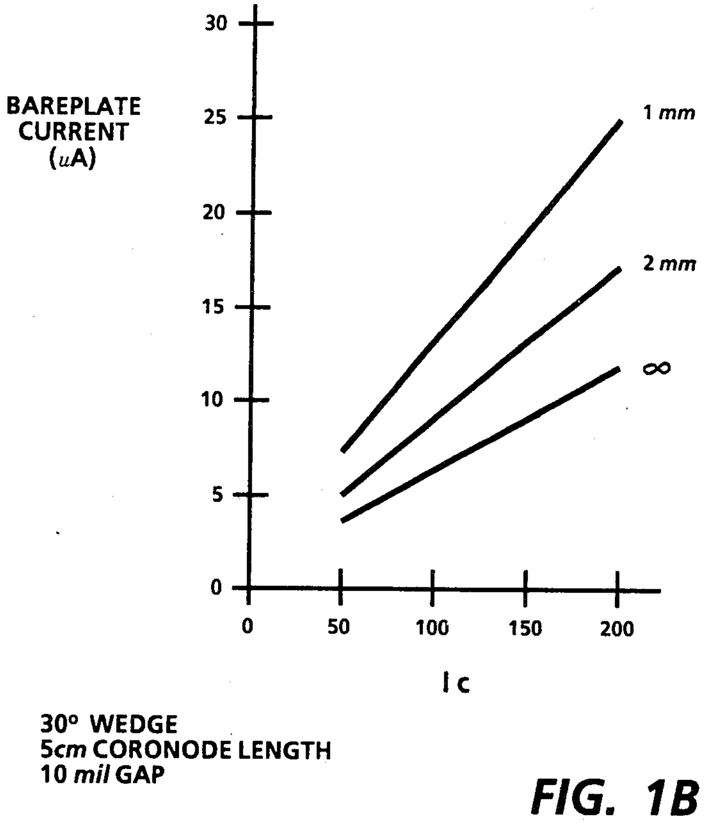

The magnitude of the efficiency gain due to the insulating wedges is a function of the distance between the wedge insulators and the coronode wire 15 and the distance between the wedge insulators themselves. In practice, as shown in FIG. 1, with coronode 15 fixed at 45 mils from the slit, 30° wedges were separated by 1 and 2 mm, and then removed (distance=$\infty$). The results are shown in FIG. 1B. Clearly, the wedges increase efficiency by about a factor of 2, which is a significant advance. Wedges have been shown to improve efficiency of ion printing units with angles of between 10° and about 80°. For angles less than about 10°, problems of air breakdown and arcing at the insulator edge occur. The preferred angles of wedges 13 and 14 shown in FIG. 1 are about 15° to 30°.

Figure 2A:
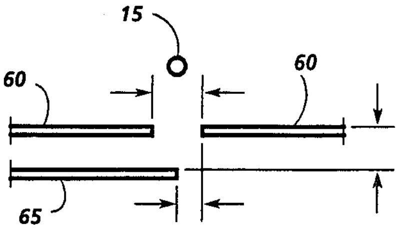
FIGS. 2A-2D shows a series of other conductive electrodes, coronode and receptor spacing geometries.
Figure 2C:
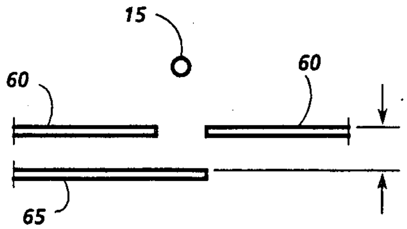
Figure 2B:
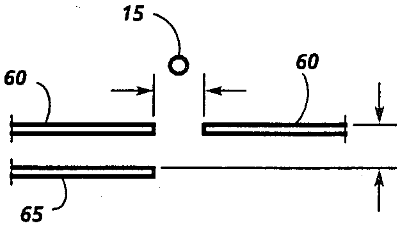
Figure 2D:
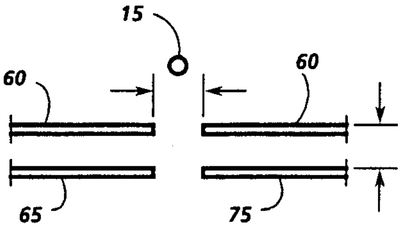

FIGS. 2A–2D are alternative embodiments representative of a number of other geometries tested with as much of the apparatus of FIG. 1 as possible. For example, a coronode wire 1.5 mils in diameter with a current $T_c$ of 6.5 $\mu$A/cm is used throughout FIGS. 2A–2D and is located 1.5 mm with respect to the plane of electrodes 60 and 70 that are spaced at a 5 mil gap with respect to each other. In FIG. 2A, modulating electrode 65 is introduced into the unit for printing and control purposes at a distance of 4 mils away from the plane of electrodes 60 and 70 and extending to a point below the center of the gap or 2.5 mils into the 5 mil gap. As for FIG. 2B, the arrangement of FIG. 2A has been changed to include electrode 65 extending to a point where it is in line with the slit edge of electrode 60. In FIG. 2C, electrode 65 is positioned in a plane 4 mils below electrode 60 and extends to the vertical plane along the slit edge of electrode 70. FIG. 2D shows two pairs of electrodes. Upper electrodes 60 and 70 provide a uniform biased plane for maintaining stable corona uniformly distributed along the slit. The edges provide fringe fields to pump ions into and through the slit. The second level or set of electrodes 65 and 75 are control electrodes. Either one, or both, may consist of a series of addressable selectively biased electrodes. The switchable electrodes may be biased such as to either absorb or repel ions. Ions may be driven through the slit or if bucking fields are provided they drive ions to either an opposing electrode or to the upper electrodes 60 and 70, thereby preventing ions from exiting the slit. The second or lower level electrode or electrodes is necessary to modulate ion output for a printing operation; that is, the upper electrodes must be at equal potential in order to maintain a uniform stream of ions into the slit.

If switchable electrodes are employed at 75 the opposing conductors 60 and 65 may be consolidated to form a single solid electrode.

Figure 3:
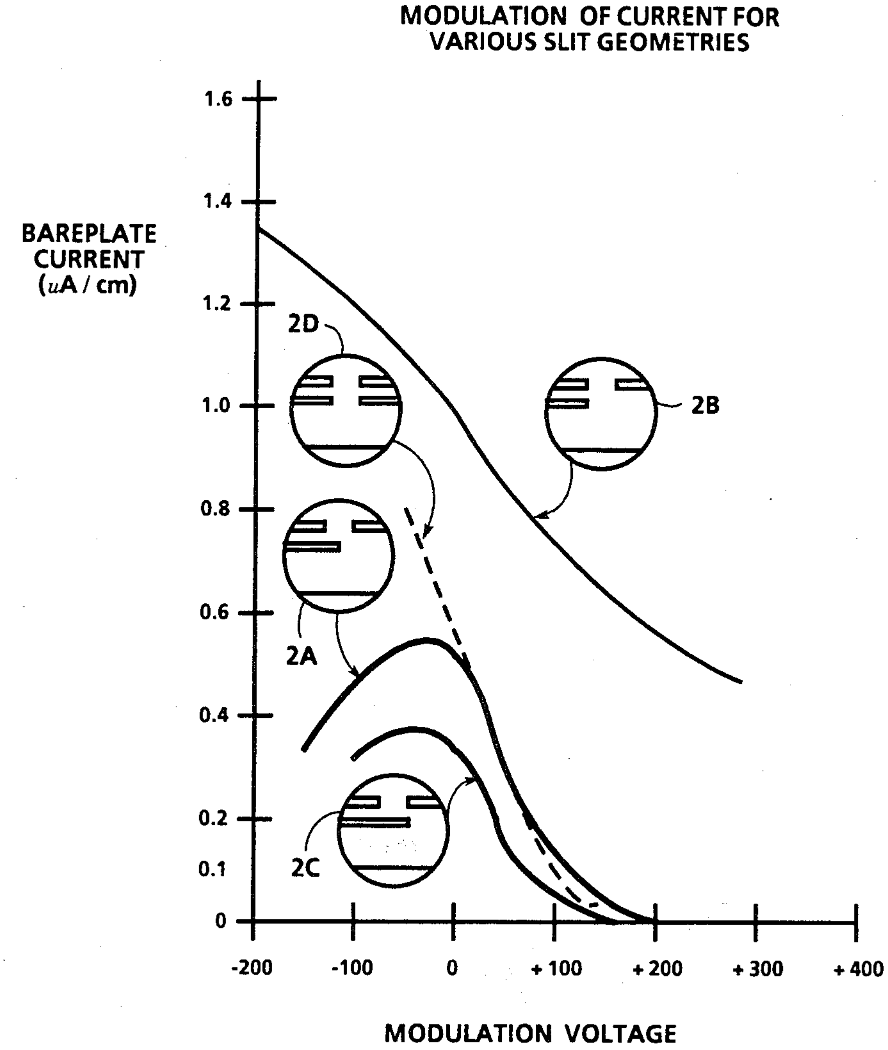
FIG. 3 illustrates the effect of modulation voltage on bareplate currents for the corresponding geometries in FIGS. 2A-2D.

The effects of modulation voltage on bare plate currents for the corresponding geometries of FIGS. 2A–2D are shown in FIG. 3. For example, as the modulation voltage is applied to addressable moldulating electrode 65 in FIG. 2B, the bare plate current will vary accordingly as shown in line 2B in FIG. 3. When the bareplate receiver is biased at a minus 700 VDC, and 0 volts is applied to the addressable electrodes, maximum bareplate current is achieved. Output current can be reduced by an order of magnitude by the application of a plug 150 volts to the addressable electrodes.

Figure 4:
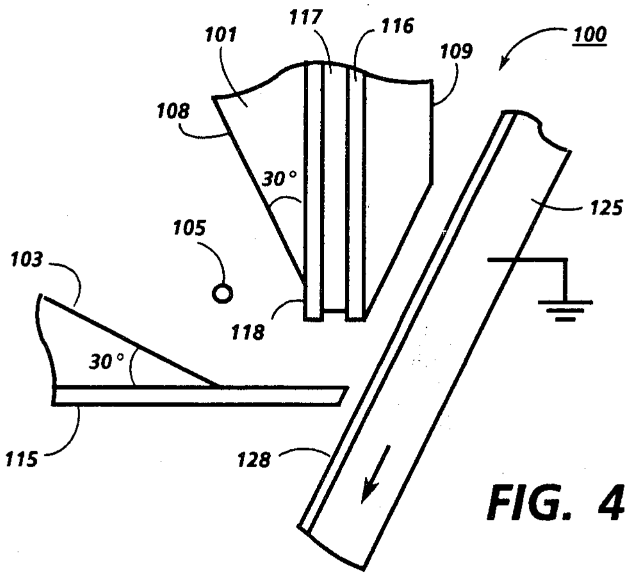
FIG. 4 is an enlarged partial cross-section of an alternative embodiment of the present invention.

In accordance with another aspect of this invention, FIG. 4 depicts a novel printing unit 100 that comprises an insulating housing 101 having beveled wedges 103 and 108 inclined toward a slit opening that is directed toward charge retentive surface 128 which is mounted on grounded conductor 125. Conductors 115 and 118 are attached to the insulating housing 101 by conventional means. An insulating substrate 117 is positioned between addressable electrodes 116 and conductor 118, while addressable electrodes 116 are mounted on a thick insulating substrate 109. Coronode 105 is positioned closely adjacent to the entrance to the slit formed between conductor 115 and conductor 118.

It should be apparent that a printing apparatus is disclosed that includes a current limited corona wire located a predetermined distance away from a slit formed between at least one pair of biased conductive members that modulate the flow of ions from the corona wire as the ions pass through the slit en route to a charge retentive surface. The conductive members have opposing insulating wedges attached thereto in order to focus additional ions toward the center of the slit. At inside edges of the slit, there are additional fringe fields that aid in pumping ions out of the slit.

While the invention has been particularly shown and described with reference to preferred embodiments thereof, it will be understood by those skilled in the art that various changes in form and details may be made therein without departing from the spirit and scope of the invention.

What is claimed is:

1. An electrographic marking apparatus for placing electrostatic charges upon a charge receptor surface, said apparatus being characterized by including:

an insulating housing having top and bottom surfaces;

electrode means positioned on said bottom surface(s) of said insulating housing and adapted to form a slit therein, one or more control electrode means positioned in a horizontal plane below said electrode means, said electrode means and said one or more control electrode means comprising at least two levels of said slit that are parallel to each other with respect to a plane through said slit, said slit being positioned less than 1mm away from the charge receptor surface, and coronode means within said insulating housing adapted to emit ions through said slit on said charge receptor.

2. The apparatus of claim 1, wherein said coronode means is about 1-5 mm away from said electrode means.

3. The apparatus of claim 1, wherein said electrode means and said one or more control electrode means are coterminous with respect to said slit.

4. The apparatus of claim 1, wherein a potential difference is applied to said electrode means.

5. The apparatus of claim 4, including high voltage means connected to said coronode means through current limiting resistance means.

6. The apparatus of claim 1, wherein said control electrodes comprises a series of individually addressable selectively biased electrodes.

7. The apparatus of claim 1, wherein said insulating housing has wedge shaped interior portions that are slanted toward said slit so as to focus additional ions from said coronode means to the center of said slit and thereby increase the efficiency of said apparatus.

8. An electrographic marking apparatus for placing electrostatic charges upon a charge receptor, said apparatus being characterized by including:

an insulating housing having a plurality of surfaces;

electrode means positioned on at least one of said surfaces and adapted to form a slit therein, at least one modulating electrode means positioned in a plane with respect to said electrode means, said electrode means and said at least one modulating electrode means comprising at least two levels of said slit that are parallel to each other with respect to a plane through said slit, and coronode means within said insulating housing adapted to emit ions through said slit onto said charge receptor, said insulating housing having wedge shaped interior portions that are slanted toward said slit so as to focus additional ions from said coronode means toward the center of said slit and thereby increase the efficiency of said apparatus.

9. The apparatus of claim 1, wherein said electrode means and said one or more control electrode means are positioned in non-skewed relationship with respect to each other.

10. The apparatus of claim 8, wherein said at least one modulating electrode includes a series of individually addressable electrodes.

11. The apparatus of claim 10, wherein said at least one modulating electrode is adapted to either repel or absorb ions within the slit.

12. The apparatus of claim 8, including means, adapted to clean said insulating housing with air drawn through a filter positioned in an opening in a surface of said insulating housing.

13. The apparatus of claim 7, wherein said coronode means includes DC voltage biased either positively or negatively.

14. The apparatus of claim 8, wherein said coronode means includes AC voltage biased either negatively or positively.

15. The apparatus of claim 1, wherein the thickness of said electrode means is not substantially greater than the slit width.

16. The apparatus of claim 8, wherein the thickness of said electrode means is not substantially greater than the slit width.

17. The apparatus of claim 1, wherein said plane through said slit is a vertical plane.

18. The apparatus of claim 8, wherein said plane through said slit is a vertical plane.

19. The apparatus of claim 8, wherein said electrode means and said at least one modulating electrode means are coterminous with respect to said slit.

20. The apparatus of claim 8, wherein said electrode means and said at least one modulating electrode means are positioned in non-skewed relationship with respect to each other.

* * * * *